Patented Oct. 3, 1922.

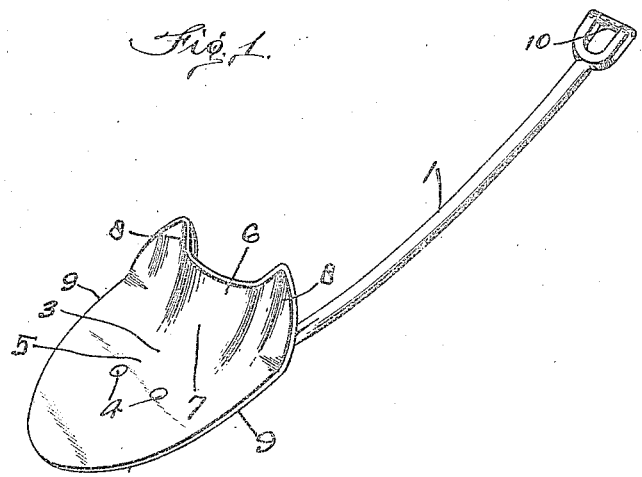
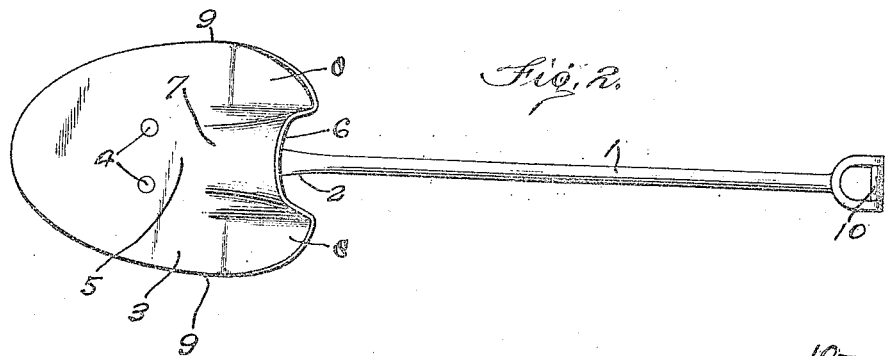
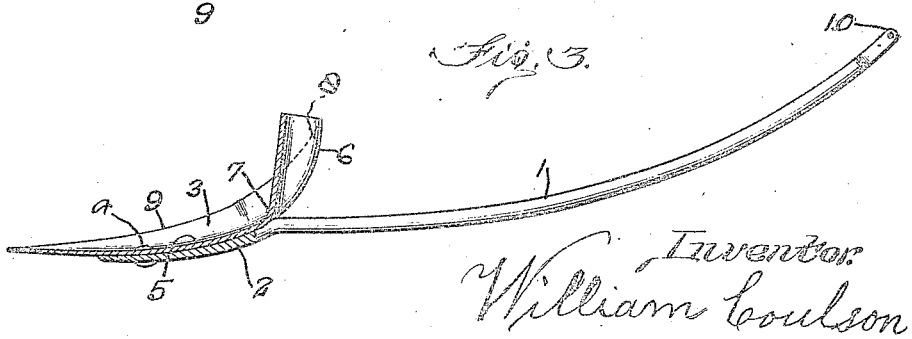

1,430,797

UNITED STATES PATENT OFFICE.

WILLIAM COULSON, OF SPRING VALLEY, ILLINOIS, ASSIGNOR TO ABE S. ROSENZWEIG, OF SPRING VALLEY, ILLINOIS.

SHOVEL.

Application filed October 22, 1920. Serial No. 418,726.

*To all whom it may concern:*

Be it known that I, WILLIAM COULSON, a citizen of the United States, and a resident of Spring Valley, in the county of Bureau and State of Illinois, have invented a new and useful Improvement in Shovels, of which the following is a full, clear, and exact description.

My invention relates to improvements in shovels, and it consists in the combinations, constructions, and arrangements herein described and claimed.

An object of my invention is to provide a shovel by means of which one can lift a greater load than he is able to lift with a shovel of ordinary type.

A further object of my invention is to provide a device of the character described which is simple in construction and which is inexpensive to manufacture.

Other objects and advantages will appear in the following specification, and the novel features of the invention will be particularly pointed out in the appended claim.

My invention is illustrated in the accompanying drawings, forming part of this application, in which—

Figure 1 is a perspective view of the device,

Figure 2 is a plan view of the device, and

Figure 3 is a side elevation of the device the shovel blade being shown in section.

In carrying out my invention, I provide a handle 1 which is preferably curved in the shape shown in Figure 3. The lower end of the handle 1 is flared outwardly so as to provide a wide surface 2 on which a shovel blade 3 is secured by means of rivets 4. The blade 3 has a slightly curved bottom 5 and has its rearward end 6 bent upwardly at 7. The rear end 6 is further provided with U-shaped recesses 8 which are disposed adjacent the sides of the blade 3. The blade 3 is further provided with sides 9.

From the foregoing description of the various parts of the device, the operation thereof may be readily understood. It will be observed that I provide a shovel blade 3 which is substantially cup-shaped and which is adapted to carry the greater amount of its load adjacent to the end 6 thereof. The operator in lifting the load contained in the shovel blade 3 grasps the handle 1 at a point midway between the ends thereof and at the end 10 of the handle. It will be observed that the hand which grasps the handle 1 at its mid point acts as a fulcrum and that the greater amount of the load in the shovel is disposed nearer this fulcrum point. The same amount of material can therefore be more easily lifted with my shovel than with the shovels of ordinary construction, since the load is disposed nearer the fulcrum point. It will also be obvious that with the same amount of effort, a greater load can be carried by my shovel than is possible with the shovels of ordinary type.

I claim:

A shovel comprising a slightly curved handle having a relatively broad flattened portion extending at an angle with respect to the handle, a shovel blade carried by the broad portion of said handle, said blade being relatively large and having an upwardly curved rear portion and an upwardly bent central portion, said blade having upwardly curved sides merging into the front flattened portion of the blade and extending to the top of the upwardly curved rear portion, said sides and upwardly extending central portion forming U-shaped recesses adjacent to the sides of said blade, said recesses being disposed in the upwardly extending portion.

WILLIAM COULSON.